United States Patent [19]
Koch et al.

[11] Patent Number: 5,353,030
[45] Date of Patent: Oct. 4, 1994

[54] METHOD FOR SIMULATING HIGH RESOLUTION SYNTHETIC APERTURE RADAR IMAGERY FROM HIGH ALTITUDE PHOTOGRAPHS

[75] Inventors: Robert D. Koch, Enon; Harold W. Dean, Beavercreek; Roger L. Overdorf, New Carlisle, all of Ohio

[73] Assignee: Science Applications International Corporation, San Diego, Calif.

[21] Appl. No.: 71,770

[22] Filed: Jun. 9, 1993

[51] Int. Cl.$^5$ .................................................. G01S 13/90
[52] U.S. Cl. ........................................ 342/169; 342/25; 342/179; 434/2
[58] Field of Search ............... 342/25, 169, 170, 171, 342/172, 179, 189, 195, 197; 434/2

[56] References Cited
U.S. PATENT DOCUMENTS

| | | | |
|---|---|---|---|
| 4,821,212 | 4/1989 | Heartz | 364/521 |
| 4,922,254 | 5/1990 | Schuessler et al. | 342/25 |

*Primary Examiner*—John B. Sotomayor
*Attorney, Agent, or Firm*—Fitch, Even, Tabin & Flannery

[57] ABSTRACT

A simple and inexpensive method for using aerial or satellite photographs of an area of terrain to form images to be used in the simulation of a series of synthetic aperture radar (SAR) images of the terrain as would be observed by a down-looking SAR mounted on an aircraft over the terrain. Scanned and digitized photographic pixels are formed and converted into radar image pixels and combined into composite images as required for SAR simulation. Terrain elevation data are assembled, correlated with the radar image pixels and converted to elevation images. These images are stored on media accessible by aircraft simulators and correlated with simulated aircraft position and altitude data to form composite images with obscured terrain features for display as darkened areas closely duplicating actual SAR images when displayed in an aircraft simulator.

9 Claims, 5 Drawing Sheets

METHOD FOR SIMULATING HIGH RESOLUTION SYNTHETIC APERTURE RADAR IMAGERY FROM HIGH ALTITUDE PHOTOGRAPHS

FIELD OF THE INVENTION

The present invention relates generally to a method for image simulation, and more specifically to the creation of simulated Synthetic Aperture Radar (SAR) images of terrain based on data obtained from high altitude photographs of the terrain.

BACKGROUND OF THE INVENTION

Synthetic Aperture Radar (SAR) uses well known techniques for increasing azimuthal radar resolution. Azimuthal resolution in radar imaging is ordinarily proportional to the size of the antenna. The physical size required of a conventional radar antenna in order to achieve an azimuthal resolution comparable to the range resolution available from typical radar bandwidths is impractical for use with radar systems carried by aircraft or satellites. SAR uses signal processing technology to replace the function of a large antenna with a small antenna on a moving platform which successively occupies all of the positions which the large antenna would have scanned.

SAR has become important in military and scientific applications. For example, the U.S. Air Force B-1B bomber uses SAR to update its navigation system and to maximize the accuracy of weapons delivery by the aircraft.

The training of SAR operators for such military applications is frequently conducted through the use of simulators. Such simulators require the use of images which accurately represent operational SAR images if the simulations produced thereby are to appear realistic. Under such realistic conditions the operators may gain experience in SAR interpretation as well as learn the functionality of the radar controls and displays. Detailed simulations of flight operations in the contiguous states of the United States provide an ideal application for development of such images which can later be correlated with actual local flight experience.

Presently, it is the practice to use actual SAR images of terrain of interest, obtained by aircraft or satellites, for such operator training. These SAR images, however, are expensive and difficult to obtain. By contrast, aerial or satellite photographs of terrain are comparatively inexpensive and readily available. The United States Geological Survey (USGS), for example, maintains a microfiche index of aerial photographs covering the entire country. The photographs, however, do not provide images that are sufficiently similar to SAR images or that can be conveniently integrated into simulator performance to provide the necessary interoperative realism for flight crew training purposes.

It is desirable therefore to implement a simple, yet inexpensive method for realistically simulating SAR images from such relatively inexpensive and readily available high altitude photographs. The present invention provides such a method.

SUMMARY OF THE INVENTION

The present invention provides a method for using a photograph of an area of terrain to develop the elements of a synthetic aperture radar (SAR) image to permit a simulator to display a SAR image as it would appear in an actual aircraft SAR imaging the area.

In its broadest form, the present invention involves: (1) scanning and digitizing aerial or satellite photographs of a region to be simulated to produce a digital image of the photograph represented as picture elements (pixels); (2) translating gray levels of the digital image pixels so as to simulate a radar image which would be obtained by a down-looking radar scanning the region from a moving aircraft; (3) storing the simulated radar image pixels for subsequent access; (4) determining a terrain elevation value for each pixel of the simulated radar image; (5) storing such elevation values in a correlative manner with the simulated radar image pixels; and (6) providing such image and elevation information in a form for use by an aircraft simulator. Then with the aircraft simulator, the present invention provides for a correlation of the radar image and elevation information with simulated aircraft position and attitude data from the simulator to form a SAR-like image of the region with realistic terrain shadows, for display to trainees by the simulator.

DETAILED DESCRIPTION OF THE INVENTION

Figure 1:
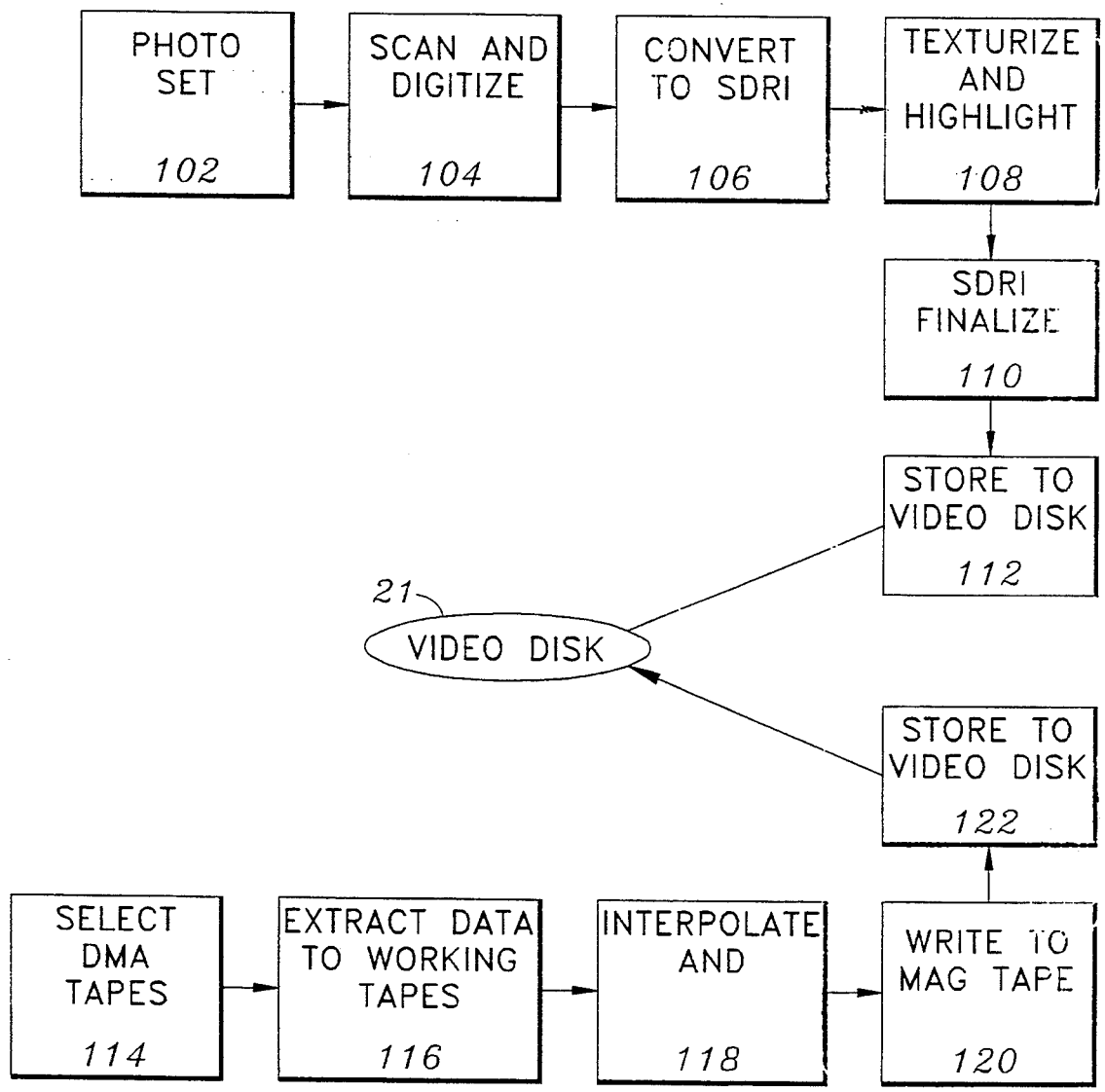
FIG. 1 is a flowchart depicting the steps involved in the method of the present invention for developing radar image pixels of terrain from photographic data, developing terrain elevation values for each pixel, and storing the data in a correlated manner in the storage device for subsequent use by an aircraft simulator.
Figure 2:
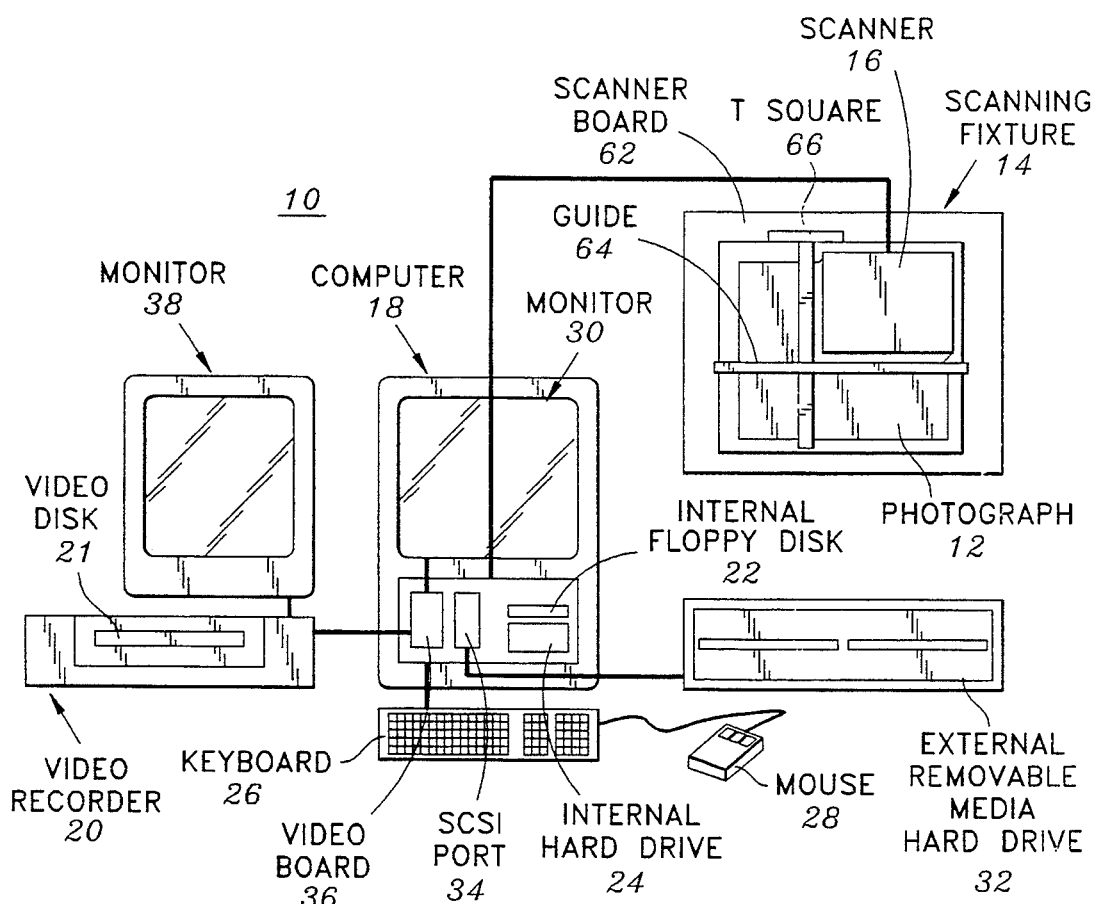
FIG. 2 is a block diagram of a hardware system for forming photographic image pixels, for permitting modification of such pixels to approximate radar image pixels and for entering such pixels as simulated digital radar images (SDRIs) into a storage device for correlation with terrain elevation data and subsequent use by an aircraft simulator.
Figure 3:
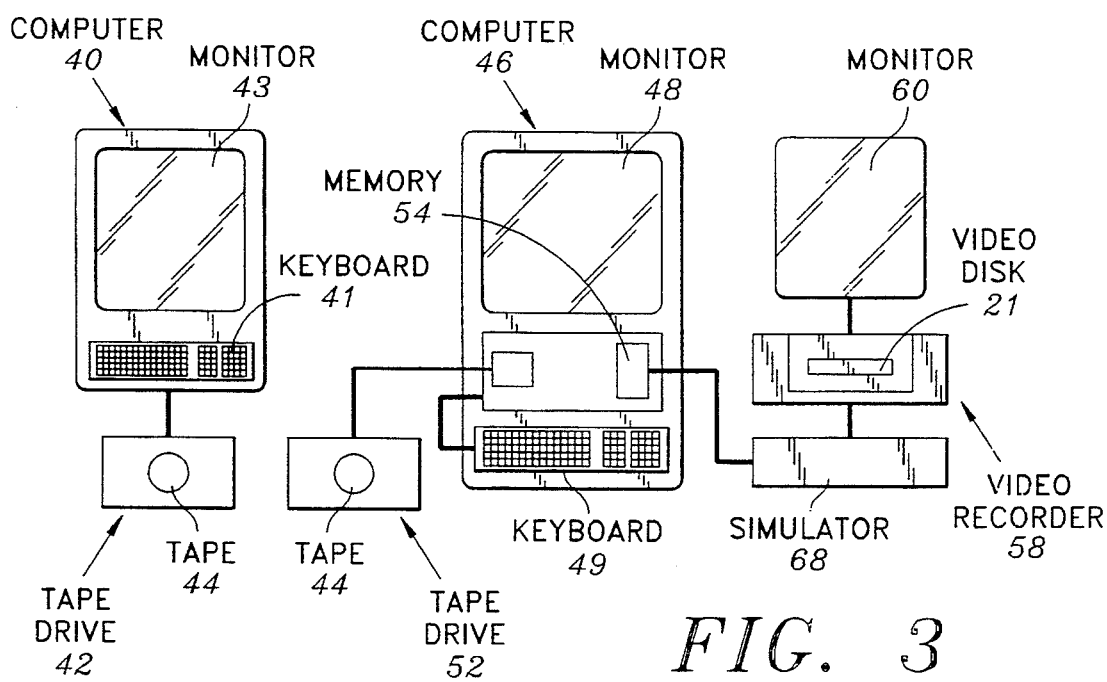
FIG. 3 is a block diagram of a hardware system for transforming terrain elevation values from archive tapes to interpolate and correlate with SDRI pixels as formed by the hardware system in the block diagram of FIG. 2 and for storage as a correlated terrain data set (TDS) in the storage device for use by the aircraft simulator.
Figure 4:
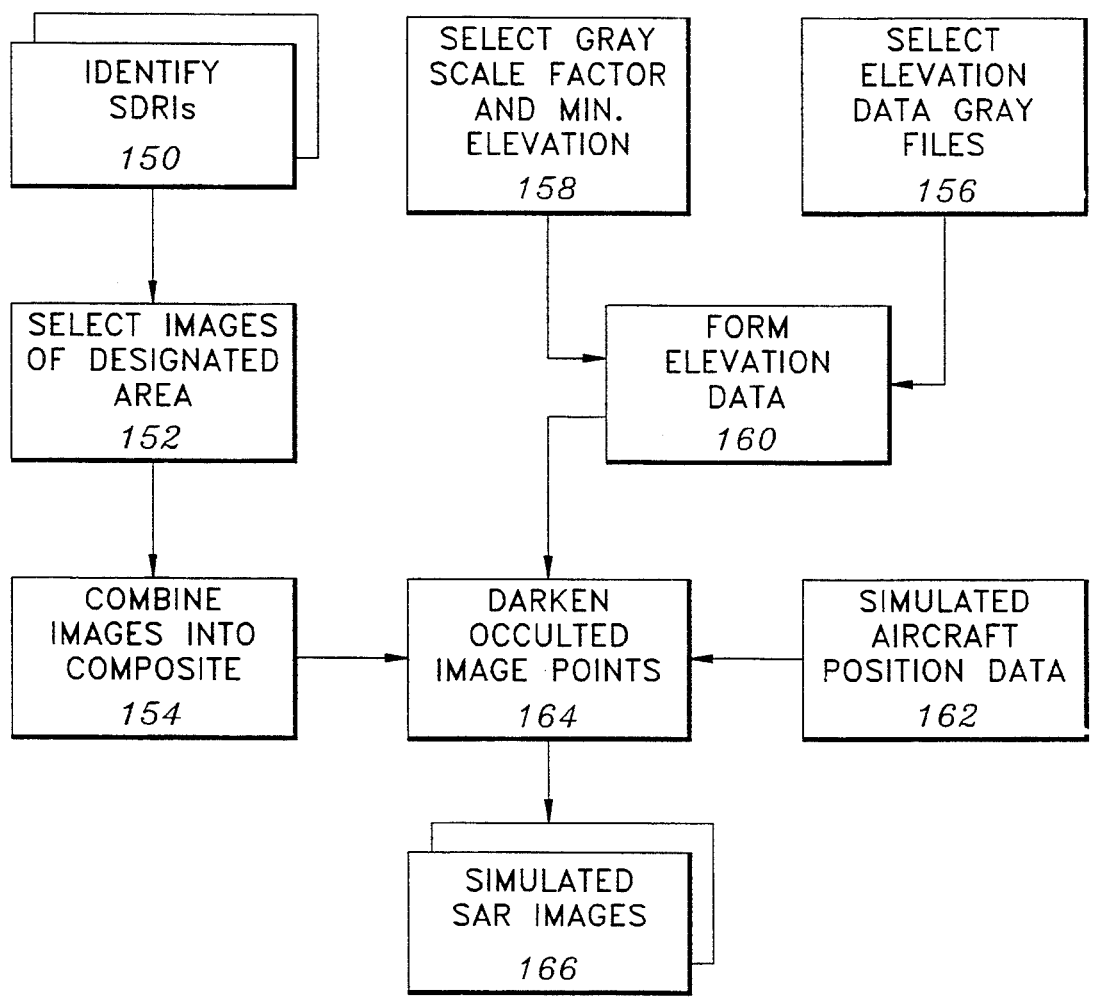
FIG. 4 is a flowchart of a method for combining SDRI pixels, and the terrain elevation data from the correlated TDS, with simulated aircraft position data from an aircraft simulator to produce composite images of the terrain as would be obtained from a SAR on an overflying aircraft.
Figure 5:
FIG. 5 shows a photographic image of terrain as used to create a SAR image such as in FIG. 6.
Figure 6:
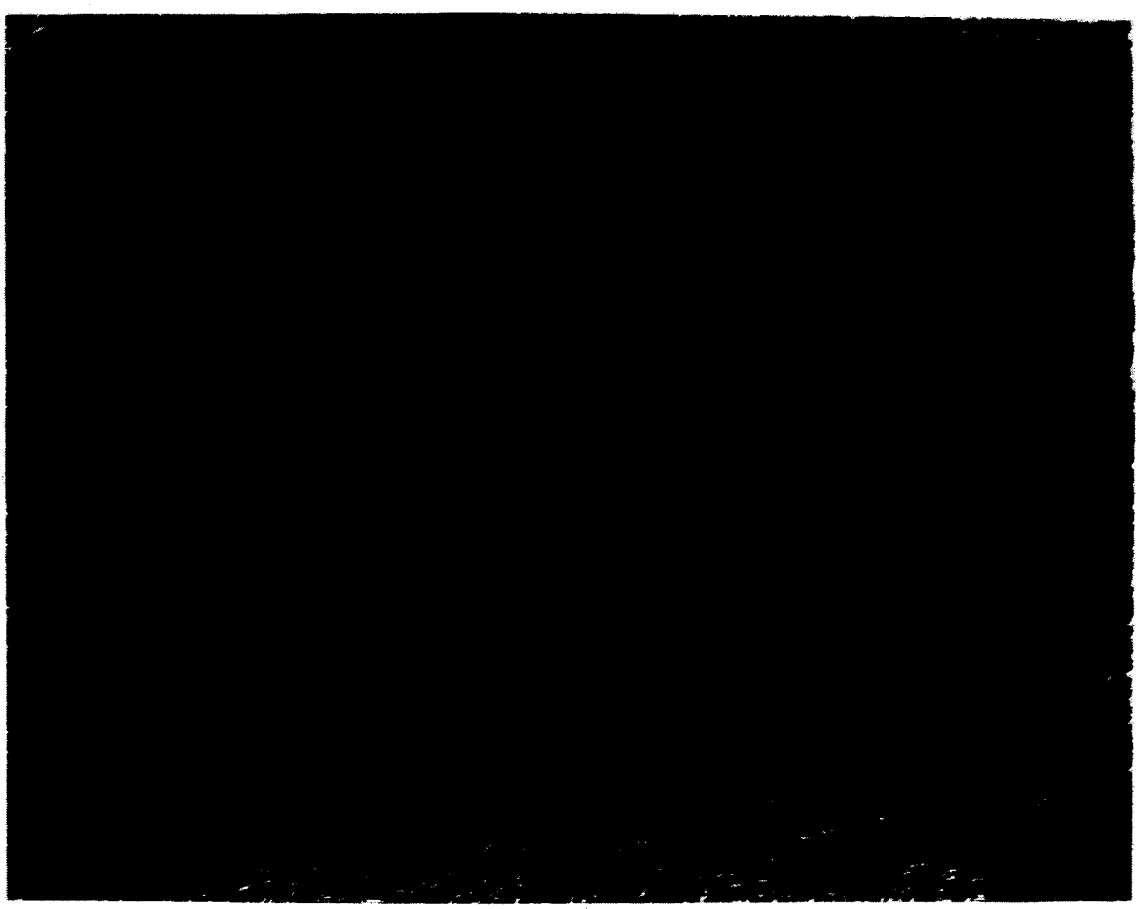
FIG. 6 shows a SAR image as produced by the method of the present invention from terrain photographs such as in FIG. 5.

The present invention comprises a method as represented in FIGS. 1 and 4, using systems 10 and 50 shown in FIGS. 2 and 3 respectively, to form a simulated synthetic aperture radar (SAR) image. Such a SAR image of a designated area of terrain is shown in FIG. 6. The image is formed by scanning photographs including the designated area, as shown in FIG. 5, selected from a set of photographs, as depicted as step 102 of FIG. 1.

In addition to step 102, the method basically comprises the steps depicted in FIG. 1, including: step 104 of scanning and digitizing the selected photographs to form a digitized photographic image (DPI) representing the designated area. The DPI comprises a set of minimal resolution picture elements (pixels), each pixel having an associated gray level related to a corresponding terrain feature optical reflectivity. From the DPI pixels, a simulated digitized radar image (SDRI) comprising a set of corresponding pixels is created in step 106 and the gray level for each pixel of the SDRI is adjusted to represent the radar reflectivity of the terrain feature instead of the optical reflectivity represented by the DPI pixels. The SDRI is texturized and highlighted in step 108 and finalized in step 110. The basic method further comprises steps 114, 116 and 118 for determining and assigning a terrain elevation value to each SDRI pixel. Then a terrain data set (TDS) is created by storing the SDRIs (step 112) and correlated terrain elevation data (steps 120 and 122) on a medium (a video disk 21) for subsequent access, for example by an aircraft simulator. Then with the aircraft simulator, the method comprises a combination of the TDS with simulated aircraft position and altitude data to form simulated SAR images of the designated area having realistic terrain shadows for display by the simulator.

With the system 10 illustrated in FIG. 2, the scanning comprises mounting a photograph 12 of a region to be simulated to a scanning fixture 14 and sequentially positioning a scanner 16 over slightly overlapping adjacent areas of the photograph 12 until the entire photograph 12 is viewed by the scanner 16. While in each position, the scanner 16 sequentially views elements of the designated area of terrain, thereby converting the smallest resolvable gray scale elements of the photograph 12 into pixels. The scanner 16, interconnected with and controlled by a computer 18, provides the pixels to the computer 18.

The computer 18 facilitates the method of the present invention whereby an operator may store such pixels in the memory of the computer 18 and subsequently use associated software and hardware to adjust the pixel gray levels. The adjustments transform the pixel gray levels from representations of optical reflectivity to those of radar reflectivity. Following such adjustments, the pixels are stored by a video recorder 20 as images on a suitable medium. In the system 10, the medium is a video disk 21 which facilitates subsequent access by an aircraft flight simulator by permitting the video disk 21 to be removed from the video recorder 20 and transferred to the aircraft flight simulator.

In practicing the method of the present invention, an operator may use the hardware of FIG. 2 wherein the computer 18 is a Macintosh IIcx computer (Mac) from Apple Computer Incorporated (Apple) with 8 megabytes (MB) of internal random access memory (RAM). The Mac 18 includes an internal floppy disk drive 22 for transferring software programs into an internal 80 MB hard disk drive 24 and subsequently applying the stored software to the method of the current invention. The Mac 18 also may provide for software-managed virtual memory in which a storage requirement exceeding the RAM available internally in the Mac 18 is supplemented by available memory on the internal 80 MB hard disk drive 24 storage device with non-removable media. Such virtual memory expands the RAM storage to the amount of memory unused by programs resident on the hard drive 24. To facilitate operator control, the Mac 18 includes a keyboard 26 and a mouse 28 as operator controlled input devices and an associated monitor 30 to display computer performance data, provide for software and accessory hardware operation selections, and most importantly display the images being translated for operator interaction.

With the Mac 18, the following hardware accessories are used to support the method of the present invention: (i) external Bernoulli removable media hard disk drive 32 with 20 MB (or larger) removable cartridges (from IOmega Corporation) operated from a small computer system interface (SCSI) port 34 in the Mac 18, (ii) a Colorboard 264 NuBus video display board 36 also mounted within the Mac 18, which includes a National Television Standards Committee (NTSC) video interface (available from RasterOps Corporation) for formatting and transferring computer video to (iii) a FD22 video recorder 20 (Model TQ-2020FC Optical Memory disk recorder) with 5½ inch video disks 21 from Panasonic Corporation for image storage and (iv) an associated 19 inch (or larger) monitor 38 to view the video images as provided to the video recorder 20.

The system of FIG. 2 also includes the following commercially available software packages for the Mac 18: (i) AppleScan from Apple for managing the operation of the scanner 16, (ii) Digital Darkroom 1.1.1 and (iii) Digital Darkroom 2.0 from Aldus Corporation by Silicon Beach Software for permitting the assembly and segmentation of images and adjustment of gray levels, (iv) Image 1.03 available from the National Institutes of Health (NIH) for permitting image area shadowing and texturizing, and (v) SAICImage, a program for transferring pixel images from the Mac 18 to video recorder 20, from Science Applications International Corporation (SAIC).

In addition, as shown in FIG. 3, the system 50 includes a VAX 11/780 computer (VAX) 40 available from Digital Equipment Corporation (DEC) (or equivalent computer) and any associated VAX-compatible 9-track tape drive (TD) 42 capable of writing data at 1600 bits per inch for transferring and converting Defense Mapping Agency (DMA) digital terrain elevation data (DTED) from an archive tape to a useable form on a working tape 44 copy. The working tape 44 is subsequently removed from the TD 42 and installed on an equivalent tape drive (TD) 52 for accessing of the DTED by an additional computer. In the system 50, the additional computer comprises a Concurrent minicomputer 46 from Concurrent Computer Corporation, Oceanport N.J., with an associated monitor 48 and a keyboard 49 incorporated in a DEC VT102 terminal for operator control. Additionally, the computer 46 includes an integral NTSC interface 54 for reading from and recording to the video disk 21 (also used in the system of FIG. 2 recorder 20 for storing radar image pixel data) using a video recorder 58 identical to video recorder 20 and an associated 9 inch video monitor 60 from Conrac Corporation for viewing the video images. The hardware of system 50 is controlled by the user through the operation of software available in computer memory and includes: in computer 40, digital data extraction (DDE) software from SAIC for extraction of DTED from DMA tapes and combining it to cover the SDRI fixpoint area. Also available in computer 40 is AMC patch generation (APG) software from SAIC for performing linear interpolations of DMA DTED to correlate the elevation data with SDRI pixels. In the computer 46, a utility program RADAR2 from SAIC is used for downloading image data through a memory board 68 to the video recorder 58. Computer 46 also uses a high resolution ground map (HRGM) software, version 1100 (HRGM1100) from SAIC for transferring the DTED available on working tape 44 from the computer 40, to the video disk 21. Of course, in the method of the present invention depicted in FIG. 1, different hardware and software capable of performing the same or similar functions can be substituted for the items shown and described relative to FIGS. 2 and 3.

In the method of the present invention, the development of the SDRIs requires selection of appropriate photographs to be used as in step 102 depicted in FIG. 1. This selection is dictated by identification of a fixpoint, a point on the terrain surface which may be used as a navigation reference by air crews. Before using the system 10 of FIG. 2 to develop an SDRI, the fixpoint must be identified. From this identification the appropriate photographs can be selected which surround and generally centrally contain the fixpoint.

Appropriate photographs providing map images for continental United States areas may be obtained from the United States Geological Survey (USGS) office in Sioux Falls, S.D., as well as from other sources. The USGS maintains a microfiche index of aerial photographs covering the entire United States. Photographs are available as 9 inch×9 inch and 36 inch×36 inch positives and 9 inch×9 inch negatives. The 9 inch-×9inch photographs represent a scale of 1 : 80000, so that each covers an area of approximately 9.87 nautical miles on a side. To obtain greater resolution in a simulation, enlargements can be ordered.

With the system 10 shown in FIG. 2, and using the method of the present invention as depicted in FIG. 1, the photograph 12, for example as shown in FIG. 5, and including the fixpoint area is selected from the photographs in step 102 and mounted to a scanner board 62. Then the photograph 12 is scanned and digitized using the scanner 16 controlled by Applescan software installed in the Mac 18. This is represented by step 104 in the method of FIG. 1. Further, in the scanning and digitizing step 104 the scanner 16 preferably is operated with its lid removed and the exposed hinges taped to reduce the hazard of scratching the photograph 12. The scanner 16 sensing surface is placed on the photograph 12 over the area to be scanned. A movable paper guide 64 and a T-square 66 can be used to accurately position the scanner 16 on the photograph 12. Typically then, six slightly overlapping scans covering adjacent areas of a single photograph may be necessary to cover all of the desired terrain in the photograph 12. To initiate such scanning operation, a double click of the mouse 28 switch by a user, with a cursor positioned on the Mac 18 monitor 28 screen on an AppleScan icon, launches the Applescan program. Then, user selection of "Restore Settings" from a FILE menu allows for the choice of program settings. The program settings include parameters such as contrast, brightness, and threshold. Examples of parameter settings when using USGS photographs are: contrast set to 2, brightness set to 9 and threshold set to 12. Next, a "Grayscale" selection from a SCAN menu is made using the mouse 28. The user then selects settings from a "Preferences" menu. The following settings are typical:
  75 DPI
  Starting Area Size is—Legal
  Graymap—Normal
  Measuring Units—Pixels
  Storage Format—PICT
  Scan Control Panel—X in the box
  Better Image Quality These settings may be saved by selecting a SAVE option from the FILE menu. Finally, user selection of SCAN from the menu initiates the actual scan of the photograph 12. When the area of the photograph 12 scan is completed, the scanned image must be saved and the scanner repositioned to scan the next image area.

Digital Darkroom 2.0 software, a drawing and image processing software package, may be used to paste the individual area scans together to create images which include the fixpoint area. In this way, a series of digitized photographic pixel images (DPIs) are created which contain the photographic gray level data and are capable of being adjusted and stored by the Mac 18. In this regard, double clicking the mouse 28 with the cursor positioned on the Digital Darkroom application icon in a hard drive menu starts the program. Next, the file containing the first scanned image is opened from the FILE menu and the selection tool activated to select a scanned image. Then, using a COPY command under an EDIT menu category places the image on a clipboard, a temporary storage area in the Mac, which allows objects to be moved between application programs or to a different position within the same application. NEW is then selected from the FILE menu to obtain a blank image area on the monitor 30. The selection of PASTE from the EDIT menu recovers the scanned image from the clipboard into the image display area, positioned using either the mouse 28 or arrow keys on the keyboard 26 to the desired location in the blank image area and fixes the image in position.

Other scanned images can be similarly brought into this new image area. Selection of a BLEND function from a PASTE CONTROL menu makes the selected image appear very subdued in brightness level and enables the user to move one selected image to overlap one or more of the other images while viewing the fixed images underneath. The selected image can be moved until the overlapping portions of the desired images are aligned and coincident. Arrow keys on the keyboard 26 permit the selected image to be moved one pixel distance at a time for a fine adjustment. A ROTATION function of the software can also be used to adjust angular misalignment and achieve image coincidence. At this point a command REPLACE from the PASTE CONTROL menu intensifies the appearance of the selected image and a click of the mouse in an area outside of the selected image will fix it in the current position to complete step 104 of the method of FIG. 1.

Next, pursuant to step 106 in FIG. 1, the digitized photographic images (DPIs) are converted into simulated high resolution radar images (SDRIs). This is achieved by use of the correlatable similarities and differences between photographic and radar image data. Alternative methods can be used to perform this step, which converts the optical reflectivity image to a radar reflectivity image. First, terrain features which appear differently in radar images than in photographs must be identified. Terrain features strongly reflective of radar energy such as buildings, bridges, railroads, towers, storage tanks, and fences must be adjusted to appear bright as in a radar image. Similarly, weak radar reflective terrain features such as roads, runways, rivers, streams, and lakes must be adjusted to appear as a dark level of gray as in a radar image.

Additionally, as in the photographic image of FIG. 5, the background landscape, whether plowed fields, planted crops, mountains, trees, or grasses, fills the largest area of the image and requires adjustment. Typically, the background landscape will be in the midrange of grayscale tone with some graininess. The brightness of the radar image of the background landscape normally varies almost inversely in brightness from that of a photographic image of the background landscape as can be noted from a comparison of FIGS. 5 and 6.

One method for producing an acceptable radar image simulation in step 106 of FIG. 1 therefore includes brightening the gray level of the pixels representing the more radar reflective features and darkening the less radar reflective features followed by an inversion of the brightness levels representing only the background landscape areas of terrain in the photographic image.

Another method which may be used in step 106 of FIG. 1, and preferred since it is somewhat simpler, is to darken the gray Level of the pixels representing the more radar reflective features and brighten the gray level of the pixels representing the less radar reflective features; thereafter inverting the gray levels of all pixels in the modified DPI.

Since in the preferred method the image is to be inverted, the terrain features are assigned brightness values which are the inverse of the desired value for the SDRI. Digital Darkroom 2.0 is used to change the brightness values. Roads, runways, rivers, streams, lakes, and other weakly reflective features are Located by cursor positioning, selected with the mouse 28, and through selection of an Image Control menu, adjusted to white or some light shade of gray. Similarly, buildings, bridges, railroads, towers, storage tanks, fences, and other highly reflective features are adjusted to be a dark shade of gray. At this point, the image is essentially a negative of what is desired. The gray levels of the entire image are then inverted through the use of a menu-selected Invert Image function to complete step 106 of FIG. 1.

Step 106 is followed by a texturizing and highlighting adjustment step 108 in which the image is opened under the control of the Image 1.03 program, another image processing software package. This program contains a feature, accessible from the menu, referred to as a SHADOWING function which acts to increase high frequency (noise) content of the of background areas of the image. Applying the shadowing function to the image accomplishes a texturization of the background areas, yielding a realistic general graininess in the background areas of the image landscape, and highlighting terrain features which produce leading edge reflections such as rivers. This image is saved completing step 108 of FIG. 1.

The image is then reopened using the Digital Darkroom software once again, as step 110 of FIG. 1 for final image processing. In step 108 of FIG. 1 the shadowing function in Image 1.03 not only adds highlighting to rivers but also introduces unrealistic highlighting for roads, runways, and other terrain features when normally do not have leading edge reflections. The unwanted highlighting is replaced during step 110 of FIG. 1 with a texture representative of the surroundings of the feature. This is be done by selecting a BRUSH function, selecting a texture from the area surrounding the feature to be modified where unwanted highlighting has been introduced, replacing the unwanted highlighting with the texture. The use of the BRUSH function under an IMAGE CONTROL selection from the menu allows any other imperfections in the image to be adjusted and the overall brightness level of the image to be shifted if needed, completing step 110 of FIG. 1.

The resultant SDRI has a realistic set of image pixel gray levels of the fixpoint area as they would be recovered by a high resolution radar looking downward. The resultant SDRI is stored on video disk 21 as depicted in step 112 of FIG. 1 by selection of the SAICImage program from the menu. The SDRI is selected for display and with the SAICImage program, a GENERATE command is selected from the menu and a crosshair appears on the monitor 30 image. The crosshair is positioned by the user, using the mouse 28, on the fixpoint, selected to be the center of the image as stored. The mouse is then clicked and the SDRI is formed into five video images, each stored in a window by the SAICImage software.

The SDRI as stored in the Mac 18 is too large to be stored in a single frame on the video disk 21. The Mac 18 image is partitioned by SAICImage into five smaller images, each of which can be stored in a single video frame. The basic SDRI is divided into four equal elements, with the center of contact of the four elements as the center identified by the crosshair. These smaller images are each approximately 512 pixels wide and 480 pixels high, with a small overlap at contiguous edges of the four images. An additional image is also formed, 512×480 pixels, centered on the crosshair and overlapping the four contiguous images. These images are then individually manually selected, beginning with the center image using the mouse 28 and a RECORD button on the video recorder 20 depressed, whereby the selected image is transferred to and stored on the video disk 21. Each of the five images is thereby sequentially stored in adjacent frames as a set of video images associated with the initially selected fixpoint. The images will be subsequently correlated with terrain elevation data for the SDRI pixels of the fixpoint area for future access by an aircraft simulator. A frame number of the storage location of the first of the five images on the video disk 21 is stored for use in the aircraft simulator for access. This completes step 112, FIG. 1.

As previously described, the storing of the SDRIs in step 112 is an important constituent step in the creation of a terrain data set (TDS) on the video disk 21. The other constituent of the TDS to be stored on the video disk 21 is terrain elevation data correlated with each pixel of the SDRI. With data from the TDS, a properly controlled aircraft simulator is able to combine simulated aircraft position data to form simulated SAR images having realistic terrain shadows for display by the simulator. To develop and correlate terrain elevation data for storage in the TDS on the video disk 21, the method of the present invention as depicted in FIG. 1 includes steps 114–122 using readily available terrain elevation data for the designated area to be simulated by the aircraft simulator.

In particular, as depicted as step 114 in FIG. 1, the method of the present invention begins with the use of one of a series of magnetic tapes from the Defense Mapping Agency (DMA). The DMA maintains Digital Terrain Elevation Data (DTED) files for the entire United States on magnetic tapes. DTED is stored as sets of files on the magnetic tapes. The structure of the DTED files consists of elevation values (in meters) as 2-byte integers associated with latitude and longitude coordinates. Each data file represents an essentially rectangular grid covering a 1 degree latitude by 1 degree longitude area with 1201 by 1201 elements in each file. There is a 1 element row/column overlap with adjacent coordinate data files. The latitude and longitude boundaries of the fixpoint area previously defined determine the data files selected from the DMA tape depicted in step 114 of FIG. 1. In step 116 of FIG. 1, to reduce potential handling damage, the data files for the latitude and longitude boundaries selected as the fixpoint area boundaries are used to identify the requisite terrain elevation files to be transferred from the DMA tapes into working tapes 44. The terrain elevation files are read from the DMA tapes from tape drive (TD) 42 into VAX 40 memory and transferred to backup tapes 44 by the TD 42 under control of the VAX 40 in the system of FIG. 3 by the DDE software selected from the keyboard 49 by the user as step 116 of FIG. 1.

To correlate the DMA DTED with the SDRI pixels, step 118 of FIG. 1 becomes the next step in the method of the present invention, with the VAX 40 under the control of the APG software. The DTED points, called 'posts', are spaced at approximately 260 to 300 feet intervals, depending on the latitude of the area covered. South of 45 degrees north latitude, which includes all the contiguous states, the convergence of the longitudinal lines is sufficiently small for the purposes of the present invention that the area bounded by the one degree lines can be considered to be rectangular. The DTED images in the system of FIG. 3 are displayed on an aircraft simulator monitor screen capable of 640×480 pixels. The physical distance represented by the distance between pixels varies with the desired resolution of the image to be displayed and is selectable in the system of FIG. 3 to display areas as 10, 5, 2.5, 1.25, and 0.625 nautical miles (nmi) on each side. As an example, for an image 5 nmi on a side, the physical distance would be (5 nmi×6076 ft/nmi) / 640 pixels=47.47 ft/pixel.

An elevation value for each pixel of the SDRI is produced by means of a linear interpolation between the elevation values corresponding to the two nearest posts in the latitudinal direction and the two nearest posts in the longitudinal direction for each display area size. This interpolation is performed by the VAX 40 using APG software from SAIC selected by the user from the keyboard 41 and implemented by the user response to prompts provided by the software. All SDRI pixel interpolations are thus calculated as a series of 25 matrices, one for each of the 5 levels of resolution of image display and for each of the 5 images generated for the fixpoint area coverage. The matrices of such interpolated elevation values are then converted to gray levels by the VAX 40 under control of the APG software as selected by the user from the computer 40 prompts displayed on the monitor 43. In order for the necessary elevation data to be stored in an accessible form in the system 50 of FIG. 3, for use in the method of the present invention, the elevation data is scaled into a digital series of gray level files or images for storage on the video disk 21. The VAX 40 searches the elevation values corresponding to particular terrain image coordinates to determine the minimum and maximum elevation values for each image. The minimum elevation is then subtracted from the maximum elevation and the result is divided by 256 to form a gray scale elevation resolution factor. Each elevation value for a radar image pixel is converted into an elevation image gray level by replacing every interpolated terrain elevation with the nearest 8-bit integer ranging in value from 0 to 255 based on the resolution factor and the relative elevation. The integer used in each case is the one for which the minimum terrain value plus the product of the gray scale factor and the 8-bit integer is closest to the terrain elevation. While such scaling reduces the accuracy of the elevation data to some extent, the resulting elevation data can be stored within the storage constraints as an image on the standard video disk 21 in the system of FIG. 3. Video image storage facilitates the ability of the aircraft simulator to use the elevation data. The gray scale factor and the minimum elevation value for each gray scale file are to be stored with the elevation images but as separate correlated images. The image location, gray files and other elevation data are written to magnetic tape 44 concluding step 120 of FIG. 1.

In step 122 of FIG. 1, the tape 44 is removed from the VAX 40 tape drive 42 and installed in the Concurrent computer 46 tape drive 52. The Concurrent computer 46 uses a Copy utility selected from the keyboard 49 by the user to control the transfer of the selected fixpoint area DTED image data, by individual sequential resolution element, into the computer 46 memory. The HRGM1100 program is selected by the user from the keyboard. From command prompts, the user transfers the DTED images into a memory map board 68 in the aircraft simulator. The data is intercepted by the RADAR2 program in the aircraft simulator and sent to the video disk 21 in response to load and copy commands controlled by the HRGM1100 program, in step 122 of FIG. 1.

The Concurrent minicomputer 46 similarly exports the gray level files for the elevation data to the video recorder 58 using the HRGM1100 software. The gray level files are visually correlated with the radar image fixpoint and surrounding areas, requiring 25 storage locations on the video disk 21 and completing the creation of the TDS on the video disk 21 for access by the aircraft simulator. These locations correspond to the images at each of five levels of resolution, 10, 5, 2.5, 1.25, and 0.625 nmi, with each having a center and four surrounding images for access by the aircraft simulator.

The method of combining SDRI and elevation data in the terrain data set (TDS) from a video disk 21 with aircraft position data to produce composite simulated SAR images of the terrain as seen by a SAR on an overflying aircraft is depicted in FIG. 4 and occurs under the control of software of the aircraft simulator in the present invention. Correlation of simulated aircraft position and altitude data with the SDRI and terrain elevation data images determines shadowing effects evident in and characteristic of terrain images formed by an overflying radar. The method of the present invention uses geometric relationships of the TDS and latitude, longitude and elevation data associated with the simulated aircraft to determine such shadowing effects. This is accomplished with data translation in a simulator 68 shown in FIG. 3 using geometric algorithms added to the simulator for performing the steps depicted in FIG. 4. Commonly used geometric algorithms may be employed for this purpose or others may be written to perform the steps of FIG. 4 in the sequence indicated and described hereinafter. As flight is simulated by the simulator, the predetermined fixpoints from the flight plan are displayed to the operator of an Offensive Operator Station, part of the simulator. The operator selects the fixpoint for viewing using a simulator control, commanding the software to retrieve the appropriate image from the video disk 21 in the recorder 58. The software, when commanded by the operator's selection, uses the storage address for locating and scaling that fixpoint to retrieve the appropriate image from the image sets stored on video disk 21.

More particularly, SDRIs which encompass the fixpoint area are read from the TDS in step 150 of FIG. 4. If the simulated aircraft position, through drift or other error, is not at the latitude and longitude for the flight path to permit the correlation of the selection of fixpoint by the operator with the primary SDRI, alternate SDRIs are selected in step 152 of FIG. 4. The SDRI pixels are arranged to form a composite image from the SDRIs in step 154 of FIG. 4 to match the off-fixpoint location of the aircraft. The corresponding DTED images as gray files are selected in step 156 and associated scale factor and minimum elevation files are also selected in step 158 of FIG. 4. The DTED is then combined in step 160 to form the correlated image elevation data. The aircraft operational simulator provides the simulated aircraft position data in step 162 of FIG. 4. Using the present invention method, the calculations combine the simulated aircraft position data with each pixel of the composite SDRI and the DTED images by applying the algorithm: altitude=(DTED * scale factor)+minimum elevation, establishing any occulting relationships in step 164 of FIG. 4 and darkening occulted pixels.

In step 164 of FIG. 4, the SAR image area (SIA) is divided into 400×400 bins, with each bin equivalent to a pixel. Each pixel width across the leading edge of the SIA represents a spoke extending the length of the SIA. A perpendicular line from the line connecting the simulated aircraft and the center of the earth is projected to the SIA and the elevation of the leading edge of the SIA determined from the elevation of the nearest pixel forming the first spoke. The slant angle from the simulated aircraft through the elevation of the first bin (pixel) is determined. A shadow elevation is thereby established. The elevation of a next-in-line bin in the spoke is compared to the shadow elevation. If the bin elevation is less than the shadow elevation, the associated pixel gray level representing radar reflectivity is set to the darkest value to indicate that the pixel is occulted. If occulting of the next-in-line bin occurs, the next successive bin is similarly evaluated until no occulting occurs. This process is repeated for the length of the spoke. The next adjacent spoke nearest bin elevation is loaded and the process repeated for all bins in the spoke. This process is repeated for the entire width of the SIA, thereby developing the shadowing to be applied to all pixels in the entire SIA. The data thus formed is saved to complete step 164 in FIG. 4.

In step 166, the final image representing the view from a SAR on a host aircraft overflying such terrain is created in video display random access memory (RAM) and immediately displayed on a multifunction radar display screen of the aircraft simulator.

While particular hardware and software and the use thereof have been described for the preferred embodiment of the present invention, the scope of the present invention is not limited to the particular embodiment described herein. Many obvious hardware and software variations and modifications can be made to accommodate other similar embodiments which are intended to be within the scope of the present invention as defined by the appended claims.

We claim:

1. A method of using photographs of a designated area, characterized by varying gray levels, to develop radar-like images for forming a simulated synthetic aperture radar (SAR) image of the designated area of terrain as would be obtained by a SAR carried by a host aircraft, comprising:
   (a) scanning and digitizing the photographs to form a digitized photographic image (DPI) representing the designated area, the DPI comprising a set of minimal resolution picture elements (pixels) each pixel having an associated gray level related to a corresponding terrain feature optical reflectivity;
   (b) from the DPI pixels, creating a simulated digitized radar image (SDRI) comprising a set of corresponding SDRI pixels and establishing for each SDRI pixel a gray level which represents a radar reflectivity of the terrain feature in place of the optical reflectivity represented by the DPI pixels;
   (c) determining and assigning a terrain elevation value to each pixel in the SDRI as correlated terrain elevation data and forming an image therefrom; and
   (d) creating a terrain data set (TDS) by storing the SDRIs and correlated terrain elevation data image on a medium for subsequent access by an aircraft simulator.

2. The method of claim 1 wherein the step of creating the SDRI from the DPI comprises: modifying the DPI by changing the gray level of pixels in the DPI to brighter values corresponding to features which are more reflective of radar energy such as images of buildings, bridges, railroad tracks, towers, storage tanks, and fences and by changing the gray level of pixels in the DPI to darker values corresponding to features which are less reflective of radar energy such as the images of roads, runways, rivers, streams, and lakes; and thereafter inverting the gray levels of all other pixels in the DPI.

3. The method of claim 1 wherein the step of creating the SDRI from the DPI comprises: modifying the DPI by changing the gray level of pixels in the DPI to darker values corresponding to features which are more reflective of radar energy such as images of buildings, bridges, railroad tracks, towers, storage tanks, and fences and by changing the gray level of pixels in the DPI to brighter values corresponding to features which are less reflective of radar energy such as the images of roads, runways, rivers, streams, and lakes; and thereafter inverting the gray levels of all pixels in the DPI.

4. The method of claim 1 wherein the step of creating the SDRI from the DPI pixels further includes adjusting the texture of any portions of the SDRI representing terrain agricultural features such as plowed fields, crops, mountains, trees, and grassland and defining terrain edge features, followed by final image overall brightness correction to improve SDRI realism.

5. The method of claim 1 wherein the step of assigning a terrain elevation value to each pixel in the SDRI comprises using terrain elevation values from an existing essentially rectangular grid of points of terrain elevation values and interpolating between two nearest grid points in a latitudinal direction and two nearest grid points in a longitudinal direction bounding an SDRI pixel to determine a terrain elevation value for the SDRI pixel and form a two dimensional terrain elevation image therefrom.

6. The method of claim 5 further comprising the storage of images of assigned terrain elevation values as gray level values correlated with the SDRI pixels as a terrain data set (TDS) on a suitable medium from which selected parts of the TDS may be retrieved.

7. The method of claim 1 further comprising:
(e) retrieving selected parts of the TDS; and
(f) correlating the retrieved parts of the TDS with a simulated aircraft position and altitude data set (ADS) in an aircraft simulator to produce a realistically shaded SAR image for a simulator display.

8. The method of claim 7 wherein step (f) comprises correlating the parts of the TDS and the ADS by combining the SDRI pixels and related terrain elevation values with the simulated aircraft position and altitude data to produce a simulated SAR image representative of an actual SAR on an aircraft overflying the designated area terrain.

9. The method of claim 8 wherein the combining comprises determining, along a line of radar propagation between a simulated aircraft position and each pixel of the designated area of terrain, an initial point of intercept of a terrain pixel by the line of radar propagation, and determining if the initial point of intercept masks a subsequent pixel along the same line of propagation, and where such masking occurs, shading the masked subsequent pixel a darker gray level, thereby producing shadowing of masked terrain features in the simulated SAR image for subsequent display by the aircraft simulator.

* * * * *